Oct. 23, 1956  S. H. FILLION  2,767,860
CUSHIONING DEVICES
Filed Aug. 12, 1953  3 Sheets-Sheet 1
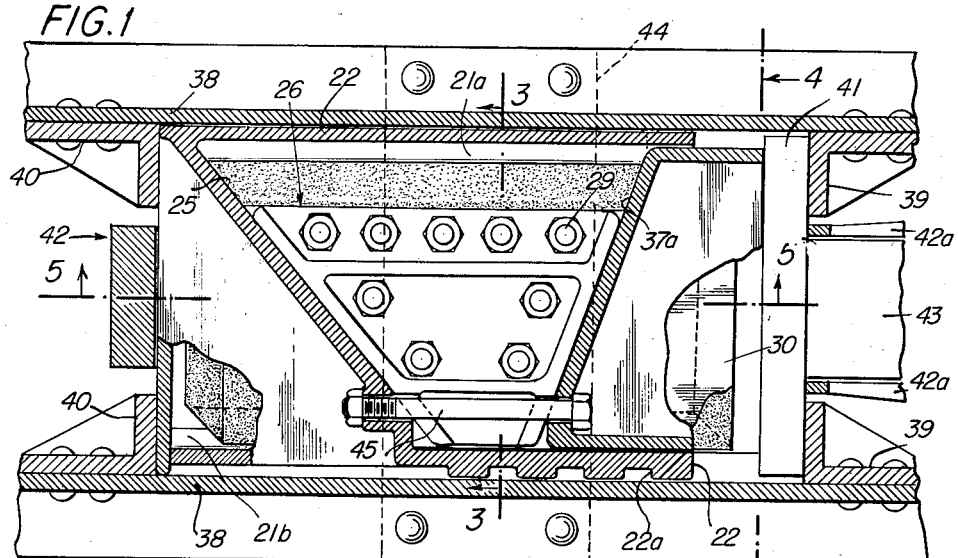
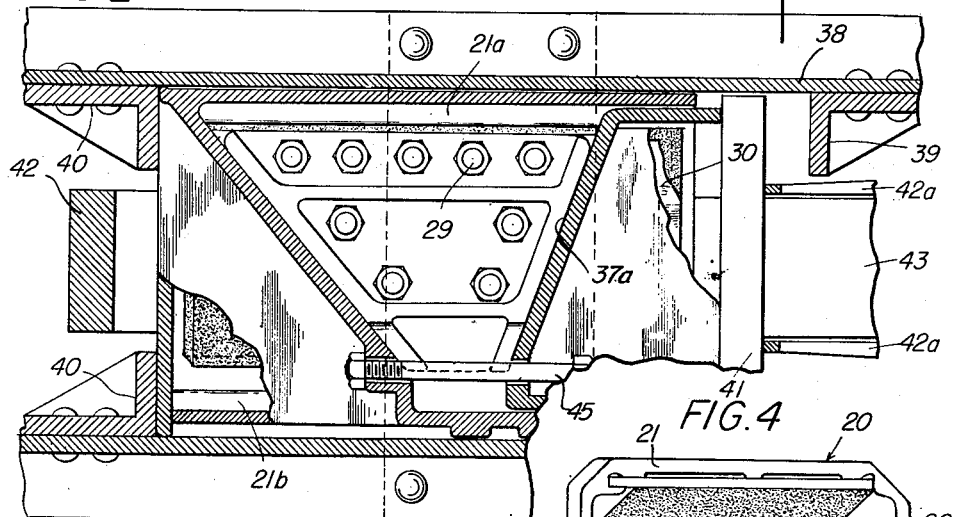
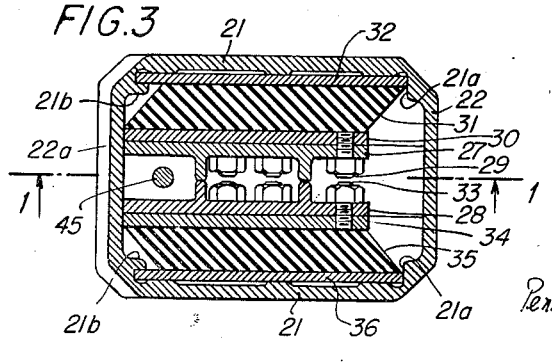
INVENTOR.
Stanley H. Fillion
BY
Pennie Edmonds Morton Barrows & Taylor Oct. 23, 1956 S. H. FILLION 2,767,860
CUSHIONING DEVICES
Filed Aug. 12, 1953. 3 Sheets-Sheet 2

INVENTOR.
Stanley H. Fillion
BY
Pennie Edmonds Morton Barrows & Taylor

Oct. 23, 1956 S. H. FILLION 2,767,860
CUSHIONING DEVICES
Filed Aug. 12, 1953 3 Sheets-Sheet 3
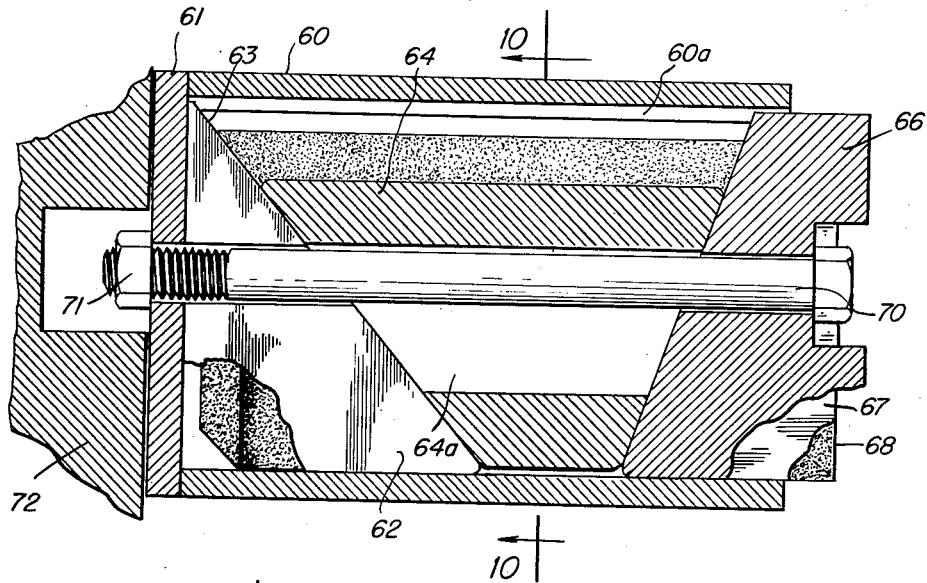
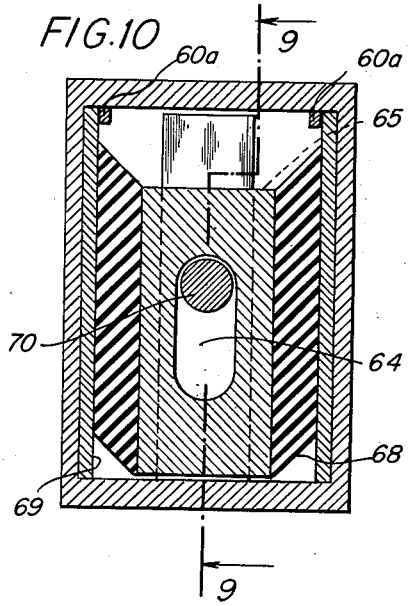
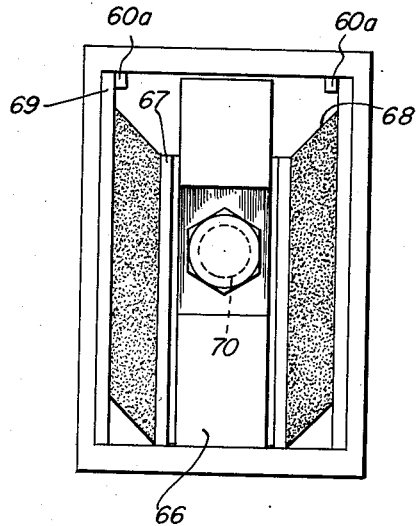
INVENTOR.
Stanley H. Fillion
BY
Pennie Edmonds Morton Barrows Taylor United States Patent Office 2,767,860
Patented Oct. 23, 1956

2,767,860

CUSHIONING DEVICES

Stanley H. Fillion, Scarsdale, N. Y., assignor to Waugh Equipment Company, New York, N. Y., a corporation of Maine Application August 12, 1953, Serial No. 373,717

14 Claims. (Cl. 213—45)

This invention relates to cushioning devices of the type, in which part of the energy applied to the device in operation is absorbed by conversion into frictional heat and dissipation of such heat, while the remainder of the energy is stored and later used to return the device to its original condition. More particularly, the invention is concerned with a novel cushioning device of the type referred to which has large capacity and low weight, so that the device is well adapted for use in a railway draft gear, as a resilient mount in shipping containers, and for like purposes.

In its simplest form, the new device employs rubber as the resilient component and it includes a pair of members mounted for relative movement against the resistance of a mass of rubber. A shoe is attached to one of the members and it has a friction surface in contact with a similar surface upon a stationary wedge. When a compressive force is applied to the device, the shoe is caused to travel along the surface of the wedge and the member attached to it causes distortion of the rubber mass. Preferably, the rubber in the new device is employed in shear and the device includes one or more shear blocks each consisting of a pair of metal plates having opposed faces, to which a rubber mass is bonded. One of the plates is held against movement, while the other can be moved relatively to the first against the resistance in shear of the rubber.

A form of the device suitable for use in a railway draft gear includes a housing having one end closed and the other open and a plunger projecting out of the housing through the open end. The plunger is guided for movement axially of the housing and the inner end of the plunger has a friction surface, which lies at an angle to the path of movement of the plunger. This friction surface engages a similar surface on a shoe, which is of wedge shape and has a friction surface at its inner end lying inclined to the path of plunger movement and bearing against an inclined friction surface on a stationary wedge. The outer friction surface of the shoe, which is in contact with the inner end of the plunger, and the inner friction surface on the shoe, which is in contact with the surface on the stationary wedge, lie at a relatively sharp acute angle to each other, although one of the surfaces on the shoe may make a relatively blunt angle with the direction of movement of the plunger. The shoe is connected to the movable plate of a rubber shear block or to such plates of a pair of shear blocks. As a result, the movement of the shoe by the plunger is resisted by rubber in shear. At the same time, movement of the shoe by the plunger causes friction to be generated at the friction surfaces of both sides of the shoe and, as a result, a large part of the applied energy is converted into heat and dissipated. The amount of energy so dissipated may be varied by changing the inclination of the contacting friction surfaces on the plunger, shoe, and wedge and, if desired, the device may be subjected to precompression.

For a better understanding of the invention, reference may be made to the accompanying drawings, in which—

Fig. 1 is a sectional view on the line 1—1 of Fig. 3 of one form of the new cushioning device installed in the draft pocket of a railway car and functioning as a draft gear;

Fig. 2 is a view similar to Fig. 1 showing the draft gear subjected to a force in buff;

Fig. 3 is a sectional view on the line 3—3 of Fig. 1;

Fig. 4 is an end view on the line 4—4 of Fig. 1;

Fig. 9 is a lengthwise sectional view of another form of the cushioning device;

Fig. 10 is a sectional view on the line 10—10 of Fig. 9; and

Fig. 11 is an end view of the cushioning device shown in Figs. 9 and 10.

Figure 5:
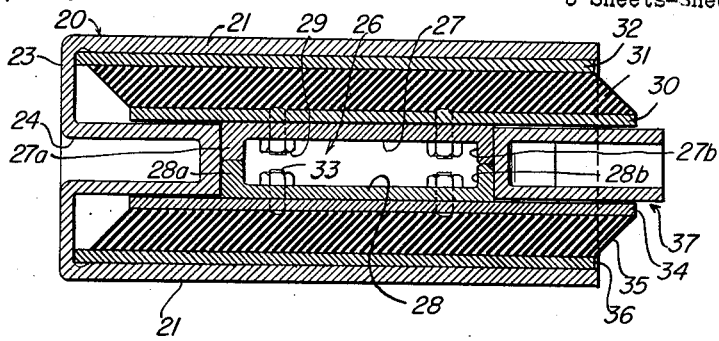
Fig. 5 is a sectional view on the line 5—5 of Fig. 1.

In Figs. 1–5, incl., a form of the new cushioning device is shown as part of a draft gear for railway use. The device comprises a housing 20, which is illustrated as of generally oblong section and made up of opposed wide walls 21 and narrow walls 22. The housing is closed at one end by an end wall 23 and is provided at its closed end with an inwardly extending stationary wedge 24, which may be a separate part inserted into the housing in engagement with its closed end and one wall 22 or, as shown, a hollow integral part of end wall 23. The wedge 24 lies in the axis of the housing and it has an inner friction surface 25 lying at an angle of about 45° to the axis and extending from one side of the housing to the other. The surface 25 is narrower than walls 22 of the housing.

A shoe 26 of wedge shape lies within the housing and, in the construction shown, is made up of a pair of plates 27, 28 lying face to face in spaced relation and having meeting longitudinal and transverse flanges. The transverse flanges 27a, 28a at the inner ends of the plates lie in contact with the friction surface 25 on the wedge 24. The plate 27 of the shoe is secured face to face by bolts 29 to one metal plate 30 of a rubber shear block, which also includes a mass 31 of rubber bonded to the outer face of plate 30 and to an opposed metal plate 32, the plates 30 and 32 being offset both laterally and longitudinally of housing 20. The plate 32 lies with one edge in contact with an internal shoulder 21a on the adjacent housing wall 21 and its other edge lies within a channel between the inner surface of wall 21 and a rib 21b integral with and parallel to the wall and spaced inwardly therefrom. In the normal condition of the device, the plate 30 of the shear block lies approximately in contact with the inner surface of one wall 22 of the housing and projects out of the open end of the housing, while the plate 32 lies about equally spaced from walls 22 and in contact with the closed end of the housing.

The plate 28 of the shoe 26 is secured by bolts 33 to one metal plate 34 of a rubber shear block, which also includes a mass 35 of rubber bonded to the outer face of plate 34 and to an opposed metal plate 36. The plate 36 is mounted like plate 32 with one edge in contact with an internal shoulder 21a on the adjacent housing wall 21 and its other edge in a channel between the inner surface of the wall and a rib 21b integral with wall 21. Plates 34 and 36 are offset from each other in the same manner as plates 30 and 32.

The plates 27 and 28 making up the shoe 26 have outer meeting flanges 27b, 28b, respectively, at their outer ends, which have outer surfaces lying in a plane and at an angle to the surface 25 on the wedge 24 at the closed end of the housing. The plane of the outer surfaces 27b, 28b of plates 27, 28 makes a relatively blunt angle with the longitudinal axis of housing 20, such as an angle of more than 60°, as shown. The planes of the surfaces of flanges 27a, 28a and of the surfaces of the flanges 27b, 28b converge toward one wall 22 of the housing and this wall may be reinforced by spaced transverse external ribs 22a lying between the outer end of wedge 24 and the open end of housing 20.

A plunger 37, which may be hollow as shown, is mounted movably between plates 30 and 34 of the two shear blocks to fill the space defined by the plates and the housing walls 22. The outer end of the plunger lies outward beyond the outer ends of plates 30 and 34 and has a surface lying in a plane transverse to the axis of the housing, while the inner end of the plunger has an inclined surface 37a in contact with the outer surfaces of the flanges 27b, 28b on the shoe 26.

When the cushioning device described is employed as a draft gear for railway use, it is ordinarily installed in a draft pocket between the spaced longitudinal sills 38 of the railway car and defined by spaced pairs of outer stops 39 and inner stops 40 secured to the opposed faces of the sills. The closed end of the housing 20 of the cushioning device engages the inner stops 40 and the outer end of the plunger 37 engages a follower block 41, which lies in contact with the outer stops 39. The device is enclosed within a yoke 42, the rear end of which normally lies in contact with the closed end 23 of the housing 20. At its forward end, the yoke has spaced wings 42a, between which extends the inner end of the shank 43 of a coupler, the shank engaging the outer face of the follower block 41 and being secured to the wings 42a by a key in the usual way. The cushioning device is supported between the sills on a carrier plate 44 connected to the bottom flanges on the sills and spanning the space between them.

In the operation of a draft gear, in which the new cushioning device forms a part, the application of a force in buff to the coupler causes its shank 43 to move the follower block 41 inwardly away from the outer stops 39. The inward movement of block 41 causes plunger 37 to be moved into housing 20 and the plunger moves shoe 26 along the friction surface 25 of the stationary wedge. At the same time, the shoe moves along the friction surface 37a at the inner end of the plunger. As the shoe moves, plates 30 and 34 of the shear blocks move with it and, as a result, the rubber masses of the blocks are subjected to shear. The resistance of the blocks to the movement of the shoe forces the plunger laterally against the wall 22 of the housing, toward which the inner and outer friction surfaces on the shoe are convergent. As a result of the actions described, a large part of the applied force is converted into frictional heat developed between the shoe and the wedge and plunger and between the plunger and the housing, and such heat is dissipated. The remainder of the applied force is stored within the rubber masses and is available to restore the gear to its original condition, when the external force is removed.

When the gear is subjected to a force in draft, the action is the same as above described, except that the follower block 41 remains in contact with stops 39, while the closed end of housing 20 moves outwardly away from the inner stops 40 with the rear end of the yoke. As before, a large part of the applied force is dissipated as frictional heat and the remainder is stored in the rubber masses subjected to shear.

In a draft gear, it may be desirable to install the cushioning device under pre-compression and, for this purpose, the wedge 24 and the plunger 37 are provided with aligned openings and the flanges at opposite ends of the wedge 26 are cut away in alignment with the openings. A bolt 45 may be inserted through the openings and taken up to draw the plunger into the housing to the extent sufficient to subject the rubber masses of the shear blocks to the desired initial load.

Figure 6:
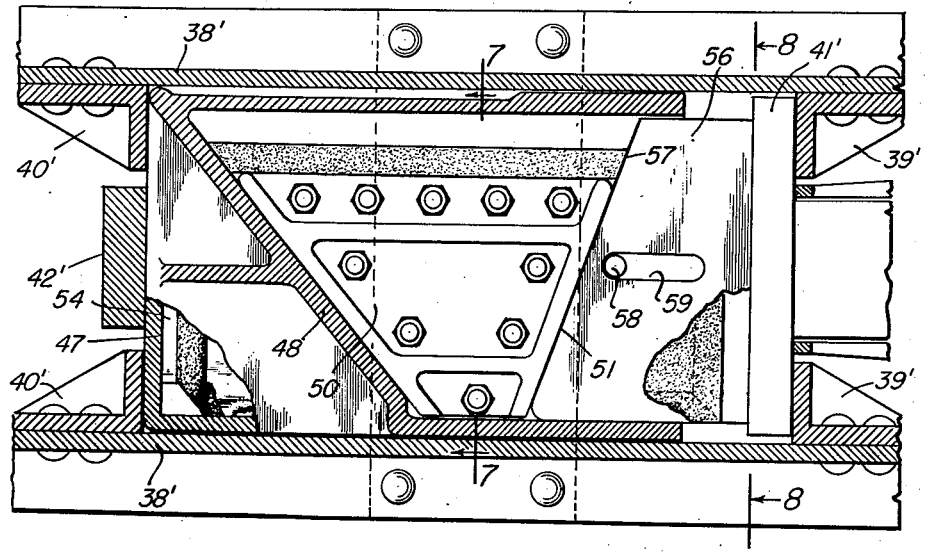
Fig. 6 is a view similar to Fig. 1 showing a modified form of the cushioning device employed in a draft gear.
Figure 7:
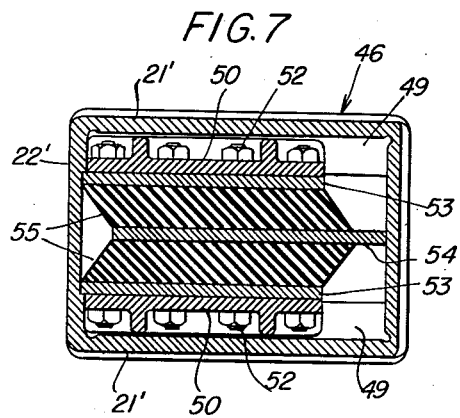
Fig. 7 is a sectional view on the line 7—7 of Fig. 6.
Figure 8:
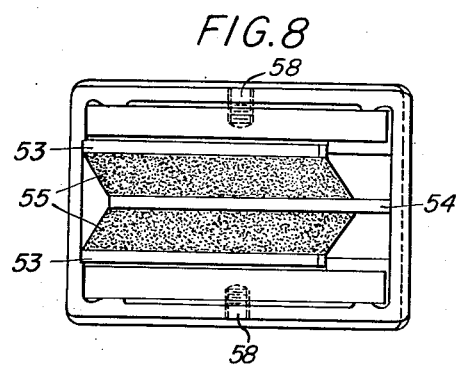
Fig. 8 is an end view on the line 8—8 of Fig. 6.

In the cushioning device illustrated in Figs. 1–5, incl., two rubber shear blocks are employed with the wedge, shoe, and plunger lying between them, but, if desired, the wedge, shoe, and plunger may be divided and the resilient means of the device placed centrally. Such a construction is illustrated in Figs. 6–8, incl. The modified form of the device includes features employed in the first form and such features are identified by the same reference characters as those previously used but with the prime mark.

In the modified construction, the housing 46 has a closed end 47 provided with integral wedges 48 extending along the opposite wide walls 21′ of the housing from one narrow wall 22′ to the other. The wedges have inclined friction surfaces 49 lying at an angle of about 45° to the axis of the housing. A shoe 50 lies in contact with the inclined friction surface 49 on each wedge and each shoe is generally similar in construction to one of the plates 27, 28 employed to form the shoe in the first form of the device. Each shoe 50 has a friction surface at its inner end making extended contact with the adjacent wedge and also has a friction surface 51 on its outer end, which is inclined to the axis of the housing and convergent with the friction surface on the inner end of the shoe toward a narrow wall 22′ on the housing.

The movements of the shoes toward the closed end of the housing are resisted by rubber in shear and the shoes may be connected to respective plates of a pair of shear blocks or a compound shear block can be used, as shown, with each shoe secured by bolts 52 to an outer plate 53 of the shear block. The shear block includes a central plate 54 and masses of rubber 55, which are bonded to the opposite faces of the central plate and the adjacent faces of the respective outer plates. The areas on the central plate, to which the rubber masses are bonded, are normally offset both longitudinally and laterally of the housing from the areas, to which the rubber masses are bonded on plates 53. The central plate 54 normally lies with one edge projecting out beyond the two rubber masses and in contact with the inner surface of a narrow wall 22′ of the housing, while the remote edges of plates 53 lie in contact with the inner surface of the opposite wall 22′ of the housing. The inner ends of plates 53 lie in contact with the end wall 47 of the housing between the wedges.

A pair of plungers 56 extend into the housing through the open end thereof on opposite sides of the shear block and in line with the shoes 50 and each plunger has an inner friction surface 57 lying in contact with the friction surface 51 at the outer end of a shoe. The plungers are movable lengthwise of the housing and are guided in such movement by the inner surfaces of the narrow walls 22′ of the housing, the outer surfaces of the plates 53, and the inner surfaces of walls 21′ of the housing. In order that the rubber masses may be maintained under pre-compression, screws 58 may be threaded through openings in the housing walls and extend into slots 59 in the plungers. The position of the screws is such that they can be inserted into the slots in the plungers only when the plungers have been subjected to a compressive force. The screws limit the outward movement of the plungers and thus maintain the rubber masses under an initial load.

When the modified form of the device is employed in a draft gear, it is installed, as previously described, in a draft pocket lying between longitudinal sills 38′ and defined at opposite ends by outer and inner stops 39′, 40′. The housing 46 lies in contact with the inner stops and a follower block 41′ lies between the ends of the plungers 56 and the outer stops 39'. The device is encircled by a yoke 42' and functions in the same manner as the first form of the device.

A form of the cushioning device for general purposes is illustrated in Figs. 9–11, incl., as including a housing 60, which is shown as rectangular in form and having one end open and the other end closed by a plate 61. A stationary wedge 62 lies within the housing in contact with plate 61 and may, if desired, be formed as an integral part of the plate. The wedge has a friction surface 63 lying at an angle to the longitudinal axis of the housing.

A shoe 64 is disposed within the housing and it is made of a block of metal, which is cut away at its inner end to form a recess receiving the stationary wedge 63 and a pair of extensions 65 projecting inwardly on opposite sides of the stationary wedge. At its outer end, the shoe is cut away to form a recess for a plunger 66 and has forward extensions 67 on opposite sides of the plunger. Rubber blocks 68 are bonded to outer faces of the shoe including the extensions and also to respective plates 69, which lie within the housing against the inner walls thereof. Plates 69 engage the end plate 61 of the housing and also the top and bottom walls of the housing, and blocks or ribs 60a attached to the inner surface of the top wall of the housing engage the plates and prevent their upper ends from moving toward each other during the operation of the device. A tie bolt 70 has its head received in a recess in the outer end of the plunger and its shank passes through an opening in the plunger, an opening 64a in the shoe, and an opening in the wedge. The bolt carries a nut 71 on its inner end and the bolt can be turned to draw the plunger into the housing and subject the rubber masses to pre-compression. The bolt also serves to hold the end plate 61 and the stationary wedge 62 in place. If desired, the plate 61 and wedge 62 can be formed to provide a recess for the nut 71, in which event, the plate 61 is secured to the remainder of the housing as by welding.

In the use of the cushioning device shown in Fig. 9, it is mounted against a stationary abutment 72 having a recess, in which the end of the bolt carrying nut 71 may be received. The load to be cushioned is imposed on the exposed end of the plunger and, whenever the load is subjected to a shock in a direction toward the abutment, the plunger moves inwardly of the housing and causes the shoe to move along the inclined surface 63 of the stationary wedge against the resistance in shear of the rubber masses. During such movement of the plunger, friction is generated between the surfaces of the shoe in contact with the wedge and the inner end of the plunger, and also between the contacting surfaces of the plunger and housing. As a result, part of the applied force is absorbed and dissipated as heat while the remainder is stored in the rubber masses and is effective to force the plunger outwardly to its original position, when the application of the force ceases.

The forms of the cushioning device shown in Figs. 1 and 9 include a housing, within which are mounted pairs of shear blocks, the outer plates of which, such as plates 32, 36 in in Fig. 1 construction, lie in contact with the inner walls of the housing. It will be apparent that, if desired, the housing itself may be omitted and the outer plates of the shear blocks provided with flanges, which serve the same purpose as the housing. Such a construction greatly lightens the weight.

In the construction shown in Figs. 1–5, incl., the shoe 26 is made in two parts, with each part connected to the adjacent plate 30, 34 of a shear block. It will be apparent that the shoe may be of one-piece construction and, if desired, the shoe and plates 30, 34 may be integral. Similarly, in the construction shown in Figs. 7 and 8, the shoes 50 may be made integral with the outer plates 53 of the shear blocks.

I claim:

1. A cushioning device, which comprises a pair of metal plates lying substantially parallel, a mass of rubber between the plates and bonded to areas on the opposed inner faces thereof, means for holding one plate against movement, the second plate being movable relatively to the first plate against the resistance in shear of the rubber mass, a shoe attached to the outer face of the movable plate, a stationary wedge, the shoe and wedge having engaging friction surfaces, a plunger acting on the shoe and movable to move the shoe along the wedge, and means for guiding the plunger in its movements.

2. A cushioning device, which comprises a pair of metal plates lying substantially parallel, a mass of rubber between the plates and bonded to areas on the opposed inner faces thereof, means for holding one plate against movement, the second plate being movable relatively to the first plate against the resistance in shear of the rubber mass, a shoe attached to the outer face of the movable plate, a stationary wedge, the shoe and wedge having engaging friction surfaces, a plunger acting on the shoe and movable to move the shoe along the wedge, the plunger and shoe having engaging friction surfaces at an angle to the engaging friction surfaces of the shoe and wedge, and means for guiding the plunger along a path at an angle to the friction surfaces on the shoe and wedge.

3. A cushioning device, which comprises a pair of metal plates lying substantially parallel, a mass of rubber between the plates and bonded to areas on the opposed inner faces thereof, means for holding one plate against movement, the second plate being movable relatively to the first plate against the resistance in shear of the rubber mass, a shoe attached to the outer face of the movable plate, a stationary wedge, the shoe and wedge having engaging friction surfaces, a plunger acting on the shoe and movable to move the shoe along the wedge, means for guiding the plunger in its movements, and means causing the plunger to impose an initial load upon the rubber mass.

4. A cushioning device, which comprises a pair of metal plates lying substantially parallel, a mass of rubber between the plates and bonded to areas on the opposed inner faces thereof, means for holding one plate against movement, the second plate being movable in its plane relatively to the first plate against the resistance in shear of the rubber mass, a shoe attached to the outer face of the second plate and movable therewith, a stationary wedge, the shoe and wedge having engaging friction surfaces, a movable plunger, cooperating friction surfaces on the plunger and shoe, and means for guiding the plunger in its movements, the movement of the plunger in one direction causing movement of the shoe along the friction surfaces on the wedge and plunger against the resistance in shear of the rubber mass.

5. A cushioning device, which comprises a pair of metal plates lying substantially parallel, a mass of rubber between the plates and bonded to areas on the opposed inner faces thereof, means for holding one plate against movement, the second plate being movable in its plane relatively to the first plate against the resistance in shear of the rubber mass, a shoe attached to the outer face of the second plate and movable therewith, a stationary wedge, the shoe and wedge having engaging friction surfaces, a movable plunger, cooperating friction surfaces on the plunger and shoe lying at an angle to the engaging friction surfaces on the shoe and wedge, and means for guiding the plunger for movement along a path lying at an angle to the cooperating friction surfaces on the plunger and shoe and to the engaging friction surfaces on the shoe and wedge.

6. A cushioning device, which comprises a pair of metal plates lying substantially parallel, a mass of rubber between the plates and bonded to areas on the opposed inner faces thereof, means for holding one plate against movement, the second plate being movable relatively to the first plate against the resistance in shear of the rubber mass, a shoe attached to the outer face of the movable plate, a stationary wedge, the shoe and wedge having engaging friction surfaces, a plunger acting on the shoe and movable to move the shoe along the wedge, means for guiding the plunger in its movements, and a connection between the plunger and stationary wedge limiting their separation, while permitting them to approach each other.

7. A cushioning device, which comprises a pair of rubber shear blocks, each consisting of a pair of metal plates secured together with their faces parallel by a body of rubber between them and bonded thereto, a stationary wedge lying between the blocks and having a friction surface, a shoe between the blocks attached to the adjacent plates thereof and having a friction surface engaging that on the wedge, a plunger extending into the space between the blocks, cooperating friction surfaces on the plunger and shoe, and means for guiding the plunger for movement along a path at an angle to the engaging friction surfaces on the shoe and the cooperating friction surfaces on the plunger and shoe.

8. A cushioning device, which comprises a compound shear block including a central metal plate, a pair of aligned outer metal plates lying on opposite sides of the central plate with their faces parallel, bodies of rubber between and bonded to the respective outer plates and the central plate, a pair of shoes secured to the outer faces of the outer plates, stationary wedge means in line with the shoes adjacent one end of the block, the shoes and wedge means having engaging friction surfaces, plunger means in line with the shoes adjacent the other end of the block, the plunger means and shoes having cooperating friction surfaces, and means for guiding the plunger means for movement along a path at an angle to the engaging friction surfaces on the shoes and wedge means and the cooperating friction surfaces on the shoes and plunger means.

9. In a cushioning device, the combination of a housing an open end and a closed end and a pair of spaced opposed internal guiding surfaces, a plunger extending into the housing through the open end and movable along a path determined by the guiding surfaces, a shoe within the housing having inner and outer friction surfaces opposed to the closed and open ends, respectively, of the housing, the friction surfaces converging toward one of the guiding surfaces on the housing, a stationary wedge within the housing having a friction surface parallel to and engaged by the inner friction surface on the shoe, the plunger having a friction surface parallel to and engaged by the outer friction surface on the shoe, the shoe normally lying close to the guiding surface on the housing, toward which the friction surfaces of the shoe converge, a pair of plates within the housing on opposite sides of and spaced from the shoe, the plates being held by the housing against movement inwardly of the housing, and rubber masses lying between and bonded to the shoe and to respective plates and subjected to shear upon inward movement of the shoe.

10. In a cushioning device, the combination of a housing having an open end and a closed end and a pair of spaced opposed internal guiding surfaces, a plunger extending into the housing through the open end and movable along a path determined by the guiding surfaces, a shoe within the housing having inner and outer friction surfaces opposed to the closed and open ends, respectively, of the housing, the friction surfaces converging toward one of the guiding surfaces on the housing, a stationary wedge within the housing having a friction surface engaged by the inner friction on the shoe, the plunger having a friction surface engaged by the outer friction surface on the shoe, a pair of plates within the housing on opposite sides of and spaced from the shoe, the plates being held by the housing against movement inwardly of the housing, rubber masses lying between and bonded to the shoe and to respective plates and subjected to shear upon inward movement of the shoe, and means acting on the housing and plunger for causing the rubber masses to be subjected to pre-loading.

11. A cushioning device, which comprises a housing having a closed end, an open end, and internal guiding surfaces, a plunger movable along the guiding surfaces of the housing and projecting out of the open end of the housing, a stationary wedge adjacent the closed end of the housing and having a friction surface within the housing, a shoe within the housing having a friction surface engaging that on the wedge, the shoe and plunger having cooperating friction surfaces lying at an angle to the engaging friction surfaces on the shoe and wedge with all said friction surfaces lying at an angle to the path of travel of the plunger, and resilient means resisting the movement of the shoe by the plunger moving into the housing, said resilient means including a plate within the housing lying substantially parallel to the path of travel of the plunger and held against movement by engagement with internal surfaces of the housing, a mass of rubber between the plate and shoe and bonded to the plate, and a plate bonded to the mass of rubber and secured to the shoe, the shoe acting through the plate to subject the rubber to shear upon movement of the shoe by the plunger moving into the housing.

12. A cushioning device as defined in claim 11, in which the resilient means includes pairs of plates within the housing lying on opposite sides of the shoe and parallel to the path of travel of the plunger, the outer plate of each pair being held against movement by engagement with internal surfaces of the housing, means connecting the inner plate of each pair to the shoe, masses of rubber between and bonded to the plates of each pair, the shoe acting through the inner plates to subject the masses to shear upon movement of the shoe by the plunger moving into the housing.

13. A cushioning device as defined in claim 11, in which the wedge is separate from the housing.

14. A cushioning device as defined in claim 11, which includes means engaging the housing and plunger to limit the movement of the plunger out of the casing.

References Cited in the file of this patent

UNITED STATES PATENTS

| | | |
|---|---|---|
| 740,349 | Wright et al. | Sept. 29, 1903 |
| 2,036,361 | Sann et al. | Apr. 7, 1936 |
| 2,118,298 | Edmunds | May 24, 1938 |
| 2,147,034 | Heitner | Feb. 14, 1939 |
| 2,231,769 | Merrill | Feb. 11, 1941 |
| 2,427,864 | Lehrman et al. | Sept. 23, 1947 |
| 2,490,738 | Lehrman | Dec. 6, 1949 |

FOREIGN PATENTS

| | | |
|---|---|---|
| 553,606 | Great Britain | May 28, 1943 |